United States Patent [19]

Venkatesan

[11] Patent Number: 4,582,688

[45] Date of Patent: Apr. 15, 1986

[54] PROCESS FOR RECOVERY OF MINERAL VALUES

[75] Inventor: Valadi N. Venkatesan, Arlington, Tex.

[73] Assignee: Mobil Oil Corporation, New York, N.Y.

[21] Appl. No.: 520,945

[22] Filed: Aug. 8, 1983

[51] Int. Cl.[4] ............................................. C01G 43/00
[52] U.S. Cl. .......................................... 423/17; 423/3; 252/626
[58] Field of Search ....................... 423/17, 3; 252/626

[56] References Cited

U.S. PATENT DOCUMENTS

| | | | |
|---|---|---|---|
| 4,296,073 | 10/1981 | Maurel et al. | 423/17 |
| 4,438,077 | 3/1984 | Tsui | 423/17 |
| 4,451,439 | 5/1984 | Maurel et al. | 423/17 |
| 4,476,099 | 10/1984 | Camp et al. | 423/17 |

Primary Examiner—John Kight
Assistant Examiner—Marvin L. Moore
Attorney, Agent, or Firm—Alexander J. McKillop; Michael G. Gilman; Charles A. Malone

[57] ABSTRACT

The present invention relates to a process for the recovery of mineral values from ores containing such wherein at least part of the mineral values is present as a refractory mineral complex. A fluid bed reactor is utilized to simultaneously solubilize the mineral values not present as the refractory complex and to separate the refractory complex from the ore.

20 Claims, 1 Drawing Figure

FLUIDIZED BED PROCESS FOR URANIUM-VANADIUM RECOVERY

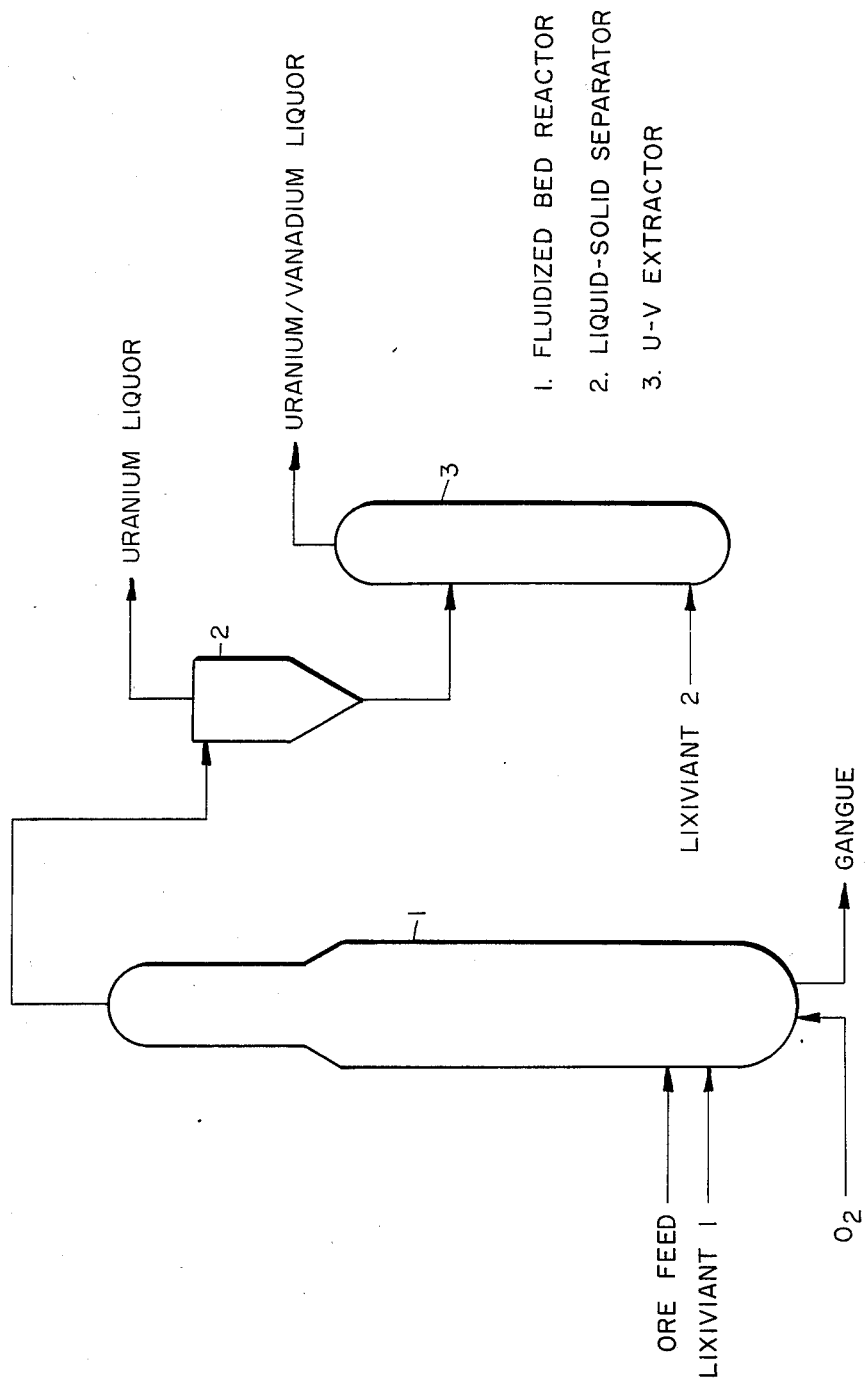

PROCESS FOR RECOVERY OF MINERAL VALUES

FIELD OF THE INVENTION

The present invention relates to an improved process for the selective leaching of mineral values from ores containing the same. More specifically, the invention relates to a novel process for the selective leaching of uranium values from ores wherein at least part of the uranium is present as uranium-mineral complexes such as uranium-vanadium complexes.

BACKGROUND OF THE INVENTION

In a uranium recovery process, the uranium ore is subjected to an extraction process wherein the minerals found in the ore are extracted by a leaching solution. The pregnant leachate is subjected to purification and concentration processes to be followed by a precipitation processes wherein the mineral values are precipitated.

The association of uranium with other ore constituents such as vanadium, molybdenum, copper and thorium may require that special purification processes be included in order to avoid certain processing problems and to prevent contamination of the uranium product. As a result, these additional constituents may become sufficiently concentrated at some point in the process to justify further treatment and the subsequent production of valuable by-products. These by-products sometimes reach a value equal to or possibly greater than that of the uranium, and the process then is usually designed for parallel production of both commodities. This is the case, for example, with ores in the Uravan Mineral Belt which are high in vanadium content.

Several known processes for the treatment of ores containing uranium and vanadium are described in Merrit, R. C., The Extractive Metallurgy of Uranium, Colorado School of Mines Research Institute, 1971, pp. 422–542. These processes apply to the above-ground operations in which the ores have to be brought up to the surface by mining. One such method utilizes strong acid leaching in two stages to improve the vanadium recovery. In the first stage, a strong acid solution, having a pH less than 1.8, is utilized to leach the uranium. The second stage utilizes a strong acid solution having a pH between 1.8 and 2.2 to leach the vanadium values therein.

Merritt describes another process for the recovery of uranium and vanadium from ores wherein the ores are initially roasted and subjected to a water leaching process to remove some of the vanadium. A carbonate leach process is followed to recover uranium and vanadium. Subsequently, the residue is further subjected to an acid leach process to recover more uranium and vanadium.

While the above processes have been successful to some extent, there is still a need for improved processes for recovering both uranium and vanadium from ores containing the same. Accordingly, the present invention provides a novel leaching process wherein the uranium and vanadium mixing is held to a minimum thus reducing the amount of solution subjected to separation steps.

SUMMARY OF THE INVENTION

The present invention relates to an improved process for the recovery of uranium and other minerals, particularly vanadium, from uranium ore wherein at least part of the uranium in the ore is present as a refractory uranium-mineral complex. The uranium ore is initially crushed to size sufficient to allow the subsequent separation of the uranium-mineral complex from the ore. The crushed ore is charged to a fluidized bed reactor wherein the fluid utilized is a mild leaching solution which solubilizes readily soluble uranium values. The velocity of the leaching solution or fluid is sufficient to allow the simultaneous separation of the undissolved uranium-mineral complex from the ore. Thus, the produced fluids from the fluidized bed reactor contain uranium values solubilized therein and the undissolved uranium-mineral complexes. The undissolved uranium mineral complexes are separated and recovered from the solution leaving the fluidized bed reactor. The uranium solution is subsequently subjected to well known processes for the recovery of uranium values therefrom. The recovered undissolved uranium-mineral complexes are subjected to processes for the separation and recovery of uranium and the other minerals in the complex. In employing the above process, the amount of solution, containing both uranium and the other mineral in the uranium-mineral complex, is substantially reduced, thus resulting in reduced amounts of fluids and uranium to be subjected to separation treatments. Furthermore, the process of the present invention separates the uranium-mineral complex from the host rock or sand thus resulting in substantially reduced volumes of solid material to be treated to recover the uranium and other minerals complexed therewith.

BRIEF DESCRIPTION OF THE DRAWING

The drawing is a schematic diagram of an apparatus in which the present invention may be practiced.

DETAILED DESCRIPTION OF THE INVENTION

The present invention is applicable to the recovery of mineral values from ore containing such wherein the mineral is found at least in two forms, a first form which may be solubilized without the solubilization of the other forms and a second form which can be separated from the host material, in a fluidized bed reactor. The soluble form of the mineral is the readily leachable or recoverable form such as the oxidized form of the mineral. The mineral is usually additionally present as a complex of several minerals and is normally more difficult to recover. To recover the complexed mineral, the ore is usually subjected to costly chemically severe operations. Thus it would be advantageous to not only reduce the amount of minerals needing such more expensive chemically severe operations, but to also reduce the volume of material treated by such processes.

The present invention is also applicable to the recovery of two or more minerals from an ore wherein at least one of the minerals can be selectively leached from the ore. For example, when molybdenum and vanadium are present, molybdenum can be selectively leached from the ore utilizing a leaching solution containing sodium bicarbonate and oxygen. Thus, for example, substances such as vanadium, molybdenum, selenium, nickel, copper, uranium, the rare earths and the like may be recovered using the process of the present invention. The main criteria is that at least one of the minerals found in the ore may be solubilized without the solubilization of at least one other mineral.

Thus, the present invention is applicable to the recovery of two or more minerals from mineral ore whether the two minerals are distinct, such as molybdenum and vanadium, or the two minerals are different forms of the same mineral, such as uraninite and refractory uranium-vanadium complexes.

In accordance with the present invention, the mineral ore is crushed to a size small enough to allow the later separation in the fluid bed reactor. Normally, crushing the ore to a size of ⅛ inch or less is sufficient. The presized ore samples are charged to the fluidized bed reactor. A solution or lixiviant, which solubilizes one of the minerals in the ore, is pumped from the bottom of the vessel to cause the liquid to flow from the bottom to the top. The liquid velocity is adjusted to provide the necessary fluidization of solids. In addition to solubilizing one of the minerals, the operation of the fluid bed reactor allows simultaneous separation of the insoluble minerals from the host rock or material. The solution produced from the fluid bed reactor contains the solubilized mineral values and the undissolved mineral forms. The undissolved mineral forms are separated from the solution and the solution is subjected to well-known processes to recover the mineral values therefrom.

In the following description and examples, the invention will be described in connection with the recovery of uranium and vanadium values by the solubilization thereof from uranium bearing ores. However, it should be clear that the invention is applicable to the recovery of minerals as described above and particularly to the recovery of uranium and other minerals from uranium ores wherein at least part of the uranium is present as a refractory uranium-mineral complex. For example, other minerals found in the form of a uranium-mineral complex, include copper, nickel, thorium, scandium, the rare earths, and the like.

Uranium minerals frequently occur in the highly siliceous rocks and sedimentary deposits, generally as a mixture of the insoluble tetravalent form and the soluble hexavalent form. Uranium is also found in association with the silicates, phosphates, and zirconates of the rare earths and with columbium, tantalum, and thorium. Pitchblende, an amorphous compound of uranium, frequently occurs with sulfite minerals and other uranium minerals such as uraninite containing, for example, 40 to 90 percent $U_3O_8$ (i.e. $UO_2.2UO_3$). In addition uranium is often associated with other metals such as calcium, thorium, iron, bismuth, copper and zinc in various mineral forms, thus, for example common uranium minerals include carnotite, $K_2(UO_2)_2(VO_4)_2.3H_2O$; coffinite, $U(SiO_4)_{1-x}(OH)_{4x}$; Schroeckingerite, $NaCa_3(UO_2)(CO_3)_3(SO_4)F.10H_2O$; and uraninite, ideally $UO_2$.

In a uranium sandstone-type deposit in the southwest region of the United States, two types of uranium minerals were found in the samples examined: a spheroidal uraninite ($UO_2$) sized at less than 1 $\mu$m and a monoclinic uranium-barium-vanadium (U-Ba-V) mineral sized at about 10 $\mu$m. In most of the ore horizons, uraninite was the predominant uranium mineral present. However, it was found that at least over one interval, the U-Ba-V mineral was of appreciable abundance. Accordingly, the present invention provides an improved process for the recovery of uranium and vanadium from the above-described ores.

In applying the present invention to recover the uranium and vanadium from the above deposits, the ore is initially crushed to a size sufficient to allow subsequent separation of the uranium-vanadium complexes from the ore. It is preferred that the uranium is crushed to a size not greater than ⅛ of an inch. The presized ore samples are charged to the fluidized bed reactor (1). A leaching solution and an oxidant are pumped from the bottom of the vessel so as to cause the solution to flow from the bottom to the top. The solution velocity is adjusted to provide the necessary fluidization of solids. The mild leaching solution utilized as the fluid in the fluid bed reactor simultaneously solubilizes the readily soluble uraninite and separates the undissolved uranium-vanadium complex from the ore. Thus, the solution leaving the fluidized bed reactor contains solubilized uranium values and undissolved uranium-vanadium complexes. The undissolved uranium-vanadium complexes are separated from the solution containing solubilized uranium values in the liquid-solid separator (2). The solution containing solubilized uranium values is subjected to well-known processes for the recovery of uranium values therefrom. The undissolved uranium-vanadium complexes are treated in reactor (3) to separate and recover the uranium and vanadium found therein.

The presence of tetravalent uranium requires that such be oxidized to its soluble hexavalent form for leaching. In this connection an oxidizing agent can be introduced prior to or simultaneously with the leaching solution as a separate solution or as a gas. Preferably, the process is operated continuously and the oxidizing agent and leaching solution are injected into the fluidized bed reactor simultaneously. It is most preferred to solubilize the oxidizing agent in the leaching solution. Additionally, it may be desirable to subject the uranium ore to a preoxidization step to be followed by the treatment with the leaching solution optionally containing additional oxidant. Preoxidation may be achieved by injecting oxygen or oxygen-containing gas, such as air, into the uranium ore. Preoxidation may also be achieved by subjecting the ore to solutions containing oxidants.

Any of the conventionally used oxidizing agents can be employed as the oxidant with the leaching solution in the present invention. For example, oxygen or oxygen-containing gases can be dissolved in water or the leaching solution or can be injected as gases to provide the necessary oxidizing agent. In addition, potassium permanganate, potassium ferricyanide, sodium hypochlorite, potassium peroxydisulfate, and hydrogen peroxide can be employed. Hydrogen peroxide, air and oxygen are preferred oxidizing agents.

Suitable mild leaching systems for use with the present invention in the recovery of uranium values, can be defined as carbonate leaching solutions hving a pH of from about 6 to about /9.5. In addition to the conventional alkaline metal carbonate and or bicarbonate systems, carbon dioxide/oxygen systems are also included as suitable mild leaching fluids. In accordance with the present invention, the solution utilized in the fluidized bed reactor is used to solubilize the easy to leach uraninite without dissolving the complexed uranium-vanadium values. After the separation of the undissolved uranium-vanadium complexes, the pregnant leachate is subjected to conventional treatments for purification, concentration, and precipitation of uranium. The treatment chosen will depend upon the overall process utilized. For example, the uranium can be concentrated by loading on ion-exchange resin beads and then eluted with sodium chloride solution. Caustic soda is then added to precipitate the uranium values.

The uranium-vanadium complex can be broken down by conventional processes. For example, the uranium-vanadium complex may be subjected to a chemically severe leaching system which may be obtained by mixing appropriate quantities of sulfuric acid, nitric acid, hydrochloric acid and others in solution so that the final pH falls between about 1 and about 3. Metal sulfates and/or metal chlorides could be added to the chemically severe leaching systems to enhance the leaching rate. Furthermore, elevated temperatures may be applied to the chemically severe leaching systems to further enhance its severity or effectiveness. To separate the uranium from vanadium produced simultaneously as a result of the dissolution of the refractory uranium-vanadium complex, solvent extraction circuits can be used. By keeping the pH below 1.8, uranium can be extracted by an organic mixture of di(2-ethylhexyl)-phosphoric acid (DHPA) and tributyl phosphate (TBP) in a base of kerosene. The concentrations of DHPA and TBP are each maintained at about 4 weight percent. The extracted uranium is then stripped by sodium carbonate solution. The vanadium in the remaining solution is extracted by adjusting the pH to from about 1.8 to about 2.2 and fed through a vanadium extraction circuit containing a mixture of about 7 weight percent DHPA and about 3 weight percent TBP. The extracted vanadium is stripped by sulfuric acid. Subsequently sodium chlorate is added to oxidize the vanadium and then the solution is neutralized with ammonia to precipitate acid red cake which is then fused in a fusion furnace to produce black vanadium ore.

Another method for the recovery of uranium and vanadium from the uranium-vanadium complex is to subject the complex to a roasting step to be followed by water leaching. The roasting converts some of the vanadium in the complex to water soluble form which is thus removed from the uranium-vanadium complex during water leaching. The residue is subjected to further carbonate or acid leaching to recover additional uranium and vanadium values.

As can be seen from the above, the present invention provides several advantages over the heretofore known methods. For example, uranium ore recovered from a sandstone type deposit in the southwest region of the United States contained less than 5 weight percent total uranium. The size of spheroidal uraninite was found to be about 1 micron, the size of monoclinic uranium-vanadium complex was found to be about 10 microns and the host sand particle size was about 100–200 microns. Thus utilizing the maximum possible total uranium concentration (5 weight percent), assuming that all of the uranium is in uranium-vanadium complex form, and utilizing the minimum size for the host sand (100 microns), it can be seen that the solid material remaining after the fluid bed treatment represents less than 1 percent of the original ore volume. When roasting is utilized to recover the uranium and vanadium from ore containing uranium-vanadium complexes, the present invention substantially reduces the volume of material to be roasted by separating the uranium-vanadium complex from the host rock or sand. This results in a significant reduction in the size of apparatus needed and a significant reduction in the amount of energy utilized in roasting.

The present invention additionally results in a significant reduction in the amount of costly chemicals utilized in the chemically severe step for the leaching of the uranium-vanadium complex. This reduction is achieved by reducing the amount of uranium to be recovered as the readily soluble component, i.e. uraninite, is removed in the fluid bed reactor. Additionally, the savings are achieved by eliminating the bulky host rock or sand from the treatment, i.e., more than 99 percent reduction.

Furthermore, the present invention results in a reduction in the amount of solution subjected to uranium/vanadium separation, because a substantial amount of the uranium—that amount present as uraninite—is selectively recovered in the fluid bed reactor.

Although the present invention has been described with preferred embodiments, it is to be understood that modifications and variations may be resorted to, without departing from the spirit and scope of this invention, as those skilled in the art will readily understand. Such modifications and variations are considered to be within the perview and scope of the appended claims.

What is claimed is:

1. An improved process for the recovery of mineral values from ore containing such wherein the mineral is found at least in two forms, a first form which is a complex of the desired mineral and other minerals and a second form which can be solubilized without solubilization of the first complex form, comprising the steps of:
   (a) crushing the ore;
   (b) charging the crushed ore to a fluidized bed reactor wherein the fluid utilized will solubilize the second mineral form without solubilizing the first complex form and wherein the fluid velocity is sufficient to simultaneously separate the first complex form from the ore;
   (c) separating and recovering the undissolved mineral complex from the solubilized mineral solution; and
   (d) recovering the mineral values from the mineral solution;
   wherein the ore is crushed in step (a) to a size sufficient to allow the subsequent separation, of the complex mineral form from the ore, in the fluidized bed reactor.

2. The process of claim 1 further comprising the steps of separating and recovering the mineral values in the recovered first mineral form.

3. The process of claim 1 wherein the desired mineral is uranium and wherein at least part of the uranium is present as refractory uranium-mineral complexes.

4. The process of claim 3 wherein the uranium-mineral complexes are uranium-vanadium complexes.

5. The process of claim 3 wherein the fluid utilized in the fluid bed reactor is an aqueous solution containing carbonates, bicarbonates, or any mixtures thereof and an oxidant.

6. The process of claim 3 wherein the fluid utilized in the fluid bed reactor is an aqueous solution containing carbon dioxide and oxygen solubilized therein.

7. The process of claim 1 wherein the ore is subjected to a preoxidation step prior to treatment in the fluid bed reactor.

8. The process of claim 1 wherein the ore is crushed to a size not larger than $\frac{1}{8}$ of an inch.

9. An improved process for the recovery of uranium and other mineral values from uranium ore wherein at least part of the uranium is present as refractory uranium-mineral complexes, comprising the steps of:
   (a) crushing the uranium ore to a size sufficient to allow subsequent separation of the uranium mineral complexes from the ore;

(b) charging the crushed ore to a fluidized bed reactor wherein the fluid utilized is a mild leaching solution which solubilizes readily solubilized uranium values and wherein the velocity of the solution is sufficient to allow simultaneous separation of undissolved uranium-mineral complexes from the ore;

(c) producing from the fluidized bed reactor a solution containing solubilized uranium values and having dispersed therein undissolved uranium-mineral complexes;

(d) separating and recovering the undissolved uranium-mineral complexes from the uranium solution;

(e) recovering uranium values from the uranium solution; and (f) subjecting the uranium-mineral complexes to a process for the separation and recovery of uranium and mineral values.

10. The process of claim 9 wherein the refractory uranium-mineral complexes comprise uranium-vanadium complexes.

11. The process of claim 9 wherein the fluid utilized in the fluid bed reactor is an aqueous solution containing carbonates, bicarbonates, or any mixtures thereof and an oxidant.

12. The process of claim 9 wherein the fluid utilized in the fluid bed reactor is an aqueous solution containing carbon dioxide and oxygen.

13. The process of claim 9 wherein the ore is subjected to a preoxidation step prior to treatment in the fluid bed reactor.

14. The process of claim 9 wherein the ore is crushed to a size not larger than ⅛ of an inch.

15. An improved process for the recovery of uranium and vanadium values from uranium ore wherein at least part of the uranium is present as a refractory uranium-vanadium complex, comprising the steps of:

(a) crushing the uranium ore;

(b) charging the crushed ore to a fluidized bed reactor wherein the fluid utilized is an aqueous solution containing carbonates, bicarbonates or any mixtures thereof and wherein the aqueous solution velocity in the fluid bed reactor is sufficient to simultaneously dissolve readily solubilized uranium values and separate insoluble uranium-vanadium values from the ore;

(c) separating and recovering insoluble uranium-vanadium complex values from the aqueous solution;

(d) recovering solubilized uranium values from the aqueous solution; and (e) subjecting the undissolved uranium-vanadium complex to processes for the separation and recovery of uranium and vanadium values;

wherein the ore is crshed in step (a) to a size sufficient to allow the subsequent separation of uranium-vanadium complex from the ore.

16. The process of claim 15 wherein an oxidant is added to the aqueous solution utilized in the fluid bed reactor.

17. The process of claim 16 wherein the aqueous solution containing carbonates, bicarbonates or any mixtures thereof and an oxidant is obtained by solubilizing carbon dioxide and oxygen in an aqueous medium.

18. The process of claim 15 wherein the readily solubilized uranium values consist essentially of uraninite.

19. The process of claim 15 wherein the ore is subjected to a preoxidation step prior to treatment in the fluid bed reactor.

20. The process of claim 15 wherein the ore is crushed to a size not larger than ⅛ of an inch.

* * * * *